United States Patent Office 3,445,430
Patented May 20, 1969

3,445,430
RESINS CONTAINING BORON
Kenneth Petersen, 22 Bellaire Drive, Scotia, N.Y. 12302
No Drawing. Filed June 22, 1966, Ser. No. 559,406
Int. Cl. C08g 33/18
U.S. Cl. 260—47
10 Claims

ABSTRACT OF THE DISCLOSURE

Boron containing resins of high thermal stability and resistance to hydrolysis are produced by heating to elevated temperatures with elimination of water of reaction a mixture of one mole boric acid, 1.25 to 2.0 moles of a polyhydric phenol such as resorcinol or hydroquinone and 0.25 to 0.75 mole of an aromatic polyamine such as m-phenylene diamine, 4,4'-diamino diphenyl ether or benzidine. When elimination of water of the condensation polymerization reaction is essentially theoretically complete the resulting thermoplastic resin may be cured to the thermoset stage by further prolonged heating at elevated temperatures or, more rapidly, by reaction with a methylenating agent such as formaldehyde.

---

This invention relates to resins containing boron and to articles prepared therefrom. More particularly, this invention relates to boron containing resins of high environmental stability and to objects prepared therefrom. In one specific aspect thereof this invention relates to boron containing resins exhibiting a high thermal stability and great resistance to hydrolysis and to articles made therefrom.

I have found that the interaction in suitable proportions of boric acid, an aromatic polyol and an aromatic polyamine results in the formation of a polymer exhibiting a high resistance to hydrolysis and a high thermal stability.

The resulting polymer in its thermoplastic stage may be thermoset by prolonged heating, preferably at temperatures above those employed in the reaction leading to the production of the resin in its thermoplastic stage. However, conversion of the thermoplastic to the thermoset resin is preferably accomplished in the presence of a small quantity of a curing agent such as a methylenating agent, for example, formaldehyde or a formaldehyde generator or donor. In the presence of such a curing agent the conversion of the resin from the thermoplastic to the thermoset stage occurs rapidly at only moderately elevated temperatures.

Obviously if it is desired to produce final shaped objects containing reenforcing or filler materials such as quartz fiber, glass fiber, asbestos fiber, mica, metallic powders or the like from the resins of my invention these reenforcing or filler materials should be added to the resin prior to conversion thereof to the thermoset stage.

One object of this invention is to provide boron containing resins of high environmental stability.

Another object of this invention is to provide boron containing resins of high thermal stability.

A further object of this invention is to provide boron containing resins exhibiting high resistance to hydrolysis.

Additional objects of this invention will become apparent as the description thereof proceeds.

The resins of this invention may be prepared by the well known melt technique. Example 1 sets forth the preparation of a typical resin of this invention in the thermoplastic condition followed by a description of the reenforcement of this thermoplastic resin while in solution and the curing of the resulting mixture by reaction with a formaldehyde donor. It is to be understood that Example 1 is illustrative only and the present invention is not to be limited or circumscribed thereby.

Example 1

Two molecular equivalents of boric acid, three molecular equivalents of resorcinol and one molecular equivalent of 4,4'-diamino diphenyl ether (oxydianiline) were placed in a closed reactor provided with an agitator and a vapor outlet leading to a condenser. The mixture was heated and stirred, the reaction temperature being gradually raised to 246° C. at which time 93% of the theoretical amount of water of reaction had been recovered from the condenser.

The resulting reaction mixture, consisting of the thermoplastic stage of the resin, was cooled somewhat and dissolved in its own weight of isopropanol. To one hundred parts by weight of this solution (containing 50 parts by weight thermoplastic resin) were added 50 parts by weight ¼ inch glass fibers, 5 parts by weight hexamethylenetetramine and 4 parts by weight calcium stearate, this last serving as a mold release agent in subsequent forming operations. The resulting mixture was stirred thoroughly, spread out in thin layers and allowed to air dry.

After the solvent had evaporated the reenforced and catalyzed thermoplastic resin was cured in suitable molds at 300° F. (approximately 150° C.) for five minutes.

A 1 5/16 inch diameter disc prepared as above described exhibited very good appearance and properties.

Standard test bars prepared as above described were subjected to various physical tests. The cured, reenforced product had a flexural strength (A.S.T.M. Method D 790–58T) of 14,500 pounds per square inch and an Izod impact strength (A.S.T.M. Method D 256–56) of 10.2 foot pounds.

A second batch of reenforced and catalyzed thermoplastic resin was prepared exactly as described in Example 1. A 1 5/16 inch diameter disc molded from this mixture exhibited very good appearance and properties. Test bars had a flexural strength of 11,400 pounds per square inch and an impact strength of 5.16 foot pounds. Additionally, the thermal stability of this repeat resin was determined and was compared to the thermal stability exhibited by a phenolic resin prepared by the acid catalyzed reaction of phenol and formaldehyde in 1:0.83 mole ratio and cured with 10% hexamethylenetetramine. The two resins were heated side by side in an air bath at 750° F. (approximately 400° C.) and from time to time the resin samples were weighed to determine the percentage of original weight retained. The data obtained are presented in the following table:

| Time at 750° F., hrs. | Percent original resin of Example 1 | Wt. retained phenolic Novolak |
|---|---|---|
| 1 | | |
| 2 | | 53.7 |
| 4 | | 6.05 |
| 8 | 60 | 2.81 |
| 16 | 50 | |
| 32 | 39 | |
|  | 33 | |

A representative selection of recipes and reaction conditions are presented in the following table, resorcinol being employed as the polyhydric phenol in all but one experiment (Run number 3 in which hydroquinone was employed). A variety of amines were employed in the several experiments as will be noted in the table. The column headed "Percent Reaction" sets forth the quotient (expressed as a percentage) of the water actually recovered from the total condenser during the reaction period divided by the theoretical quantity of water that would result had the reaction proceeded to completion.

methyl ethyl methylene, diethyl methylene, etcetera, radicals; the oxy, carbonyl, sulfonyl, etcetera bivalent bridging radicals and the like.

If desired, a portion of the aromatic polyol component of the recipes may be replaced by an aromatic monohydric phenol such as phenol, cresols, xylenols, naphthols, etcetera. When such a partial replacement is made, as a general rule from 5 to 25 mole percent of the aromatic

| Run No. | Molecular equivalents of reactants | | | Maximum temp., °C. | Percent reaction | Diamine |
| --- | --- | --- | --- | --- | --- | --- |
| | Boric acid | Resorcinol | Amine | | | |
| 1 | 2 | 3 | 1 | 220 | 77 | 4,4'-diamino diphenyl ether. |
| 2 | 2 | 3 | 1 | 246 | 93 | Do. |
| 3 | 2 | ¹3 | 1 | 300 | 98 | Do. |
| 4 | 2 | 3 | 1 | 220 | 62 | m-Phenylene diamine. |
| 5 | 2 | 3 | 1 | 260 | 87 | Do. |
| 6 | 2 | 3.5 | 1 | 266 | 93 | Do. |
| 7 | 2 | 3.5 | 1 | 247 | 74 | Benzidine. |

¹ Hydroquinone employed.

It will be noted that Run No. 2 of the table sets forth the recipe and reaction conditions employed in preparing the resins described in Example 1 hereof. The excellent heat resistance of this resin has already been mentioned. The resin prepared in Run No. 1 of the preceding table also exhibited excellent heat resistance and the same was true of the resin of Run No. 3 where hydroquinone was employed as the polyhydric phenol. The cured resin of this run, when tested for thermal stability as previously described herein, retained 52% of its original weight after 4 hours at 750° F. (approximately 400° C.), 43% after 8 hours, 32% after 16 hours and 27% after 32 hours.

Resins prepared using m-phenylene diamine as the polyamine component (Runs 4, 5 and 6), are essentially similar in physical properties to those made using 4,4'-diamino diphenyl ether. Thus, the resin of Run No. 6, reenforced, cured and molded as previously described had a flexural strength of 7400 pounds per square inch and an impact strength of 5.72 foot pounds. Similarly, the resin of Run No. 5, tested as previously described, retained 66% of its original weight after 4 hours at 750° F. (approximately 400° C.), 63% after 8 hours, 55% after 16 hours and 50% after 32 hours.

Benzidine was employed as the aromatic polyamine in the preparation of the resin of Run No. 7. This resin, reenforced, cured and molded as previously described produced 15/16 diameter discs of good appearance and properties and bars exhibiting a flexural strength of 11,000 pounds per square inch and an impact strength of 5.16 foot pounds.

Boron containing resins of the prior art have been extremely susceptible to hydrolysis and this has greatly hindered their commercial utilization. In contrast, the resins of the present invention are much more resistant to hydrolysis. As an example of this stability, a weighed portion of the molded bar of the resin of Run No. 7 employed in the impact strength determination was immersed in water at 100° F. After a 48 hour period the sample was removed from the water, dried and reweighed. The weight gain was only 0.274%.

While this invention has been described in connection with the use of the polyhydric phenols hydroquinone and more particularly, resorcinol as the aromatic polyol component of the reaction mixture, this invention is not limited thereto as other aromatic polyols may be substituted, in part or entirely, for the polyhydric phenols employed in the previous recipes. Among such additional aromatic polyols that may be employed in the practice of this invention may be mentioned, γ-diphenol (4,4'-dihydroxy biphenyl), phloroglucinol, and aromatic polyols of the general formula:

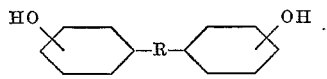

where R is a bivalent bridging radical such as the methylene, ethylidene, cyclohexylidene, dimethyl methylene, polyol component is replaced with an equimolecular quantity of the selected aromatic monohydric phenol.

Likewise, while this invention has been described in connection with the use of the aromatic polyamines m-phenylene diamine, benzidine and 4,4'-diamino diphenyl ether as the aromatic polyamine component of the reaction mixture the invention is not limited thereto as other aromatic polyamines may be substituted in part or entirely in the previous recipes. A host of other suitable aromatic polyamines may be envisaged by consulting the previous discussion with respect to alternates for the aromatic polyol components of specific recipes. Thus, suitable alternate aromatic polyamines embrace such materials as other phenylene diamines, 1,2,4-triamine benzene, 2,4,6-triaminotoluene, diamine biphenyls in addition to 4,4'-diamino biphenyl employed in the specific example of the preceding table, aromatic polyamines of the general formula:

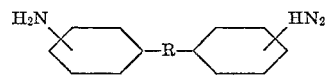

where R is as previously defined, in addition to the 4,4-diamino diphenyl ether (R=oxy) employed in Runs 1–3 hereof, etcetera.

Again, if desired, from about 5 to 25 mole percent of aromatic polyamine component of the recipes may be replaced by an equimolecular quantity of an aromatic monoamine in the practice of this invention.

Also, as will be evident to those skilled in the chemical arts, boric acid may be replaced, in part or entirely, with boric oxide in the preparation of the resins of this invention.

In the preparation of the thermally stable, hydrolysis resistant resins of this invention the most satisfactory products, all points of view considered, are obtained by employing, per mole of boric acid, from about 1.25 to 2 moles of the aromatic polyol component together with from about 0.25 to 0.75 mole of the aromatic polyamine component. With recipes having reactant ratios falling within or near to the molecular ranges set forth, at the conclusion of the reaction resulting in formation of the thermoplastic stage of the resin sufficient functional groups remain unreacted to provide for the subsequent curing of the thermoplastic resin to the thermoset stage by further heating at an elevated temperature or by reaction at comparatively low temperatures with a methylenating agent such as formaldehyde or a formaldehyde polymer.

If desired, the preparation of the resin, reenforcement and curing may all be accomplished in one operation by mixing the recipe components with the selected reenforcing agent or agents and then bringing the mixture to a temperature of 300° C. or above in the absence of a curing agent or to a temperature of about 150° C. in the presence of a curing agent such as a formaldehyde donor.

I claim:
1. A process for the manufacture of resins characterized by high thermal stability and high resistance to hydrolysis, comprising reacting at elevated temperatures with the elimination of water of reaction, a ratio of (1) 1.0 mole of a compound selected from the group consisting of boric acid and boric oxide, (2) from 1.25 to 2.0 moles of a compound selected from the group consisting of resorcinol, hydroquinone, 4,4'-dihydroxy biphenyl, and aromatic polyols of the general formula:

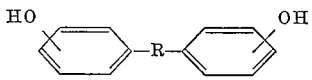

where R is a bivalent bridging radical selected from the group consisting of methylene, ethylidine, cyclohexylidine, dimethyl methylene, methyl ethyl methylene, diethylmethylene, oxy, carbonyl, and sulfonyl, and (3) from 0.25 to 0.75 mole of a compound selected from the group consisting of diamino benzene, diamino biphenyls, and aromatic polyamines of the general formula:

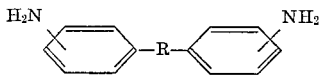

where R is a bivalent bridging radical selected from the group consisting of methylene, ethylidine, cyclohexylidine, dimethyl methylene, methyl ethyl methylene, diethylmethene, oxy, carbonyl and sulfonyl.

2. The process of claim 1 in which the reaction mixture is boric acid, resorcinol and meta-phenylene diamine.

3. The process of claim 1 in which the reaction mixture is boric acid, resorcinol and benzidine.

4. The process of claim 1 in which the reaction mixture is boric acid, resorcinol and 4,4'-diamino diphenyl ether.

5. The process of claim 1 in which the reaction mixture is boric acid, hydroquinone and 4,4'-diamino diphenyl ether.

6. A resinous condensation product of high thermal stability and high resistance to hydrolysis which is the product of the process of reacting at elevated temperatures with the elimination of water of reaction, a ratio of (1) 1.0 mole of a compound selected from the group consisting of boric acid and boric oxide, (2) from 1.25 to 2.0 moles of a compound selected from the group consisting of resorcinol, hydroquinone, 4,4'-dihydroxy biphenyl, and aromatic polyols of the general formula:

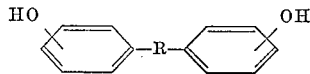

where R is a bivalent bridging radical selected from the group consisting of methylene, ethylidine, cyclohexylidine, dimethyl methylene, methyl ethyl methylene, diethyl methylene, oxy, carbonyl, and sulfonyl, and (3) from 0.25 to 0.75 mole of a compound selected from the group consisting of diamino benzenes, diamino biphenyls, and aromatic polyamines of the general formula:

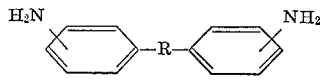

where R is a bivalent bridging radical selected from the group consisting of methylene, ethylidine, cyclohexylidine, dimethyl methylene, methyl ethyl methylene, diethyl methylene, oxy, carbonyl, and sulfonyl.

7. The product of claim 6 in which the reaction mixture is boric acid and resorcinol, and meta-phenylene diamine.

8. The product of claim 6 in which the reaction mixture is boric acid, resorcinol, and benzidine.

9. The product of claim 6 in which the reaction mixture is boric acid, resorcinol, and 4,4'-diamino diphenyl ether.

10. The product of claim 6 in which the reaction mixture is boric acid, hydroquinone, and 4,4'-diamino diphenyl ether.

References Cited

UNITED STATES PATENTS

| | | | |
|---|---|---|---|
| 1,975,890 | 10/1934 | Williams et al. | 260—43 |
| 3,275,600 | 9/1966 | Bower | 260—47 |
| 3,014,061 | 12/1961 | Irish et al. | 260—462 |

FOREIGN PATENTS

| | | |
|---|---|---|
| 807,851 | 1/1959 | Great Britain. |
| 957,611 | 5/1964 | Great Britain. |

WILLIAM H. SHORT, *Primary Examiner.*

M. GOLDSTEIN, *Assistant Examiner.*

U.S. Cl. X.R.

260—33.4, 38, 51.5, 52, 54